3,304,267
METHOD OF INHIBITING RUST AND CORROSION IN A FUEL OIL TANK
Leo D. Miller, 33 Claudet Way, Eastchester, N.Y. 10709
No Drawing. Continuation of application Ser. No. 861,185, Dec. 22, 1959. This application Apr. 13, 1964, Ser. No. 361,322
1 Claim. (Cl. 252—389)

This is a continuation application of application Serial No. 861,185, filed December 22, 1959, now abandoned, entitled, Rust and Corrosion Inhibitor for Fuel Oil Tanks.

The present invention relates to a rust and corrosion inhibitor for fuel oil tanks and, more particularly, it relates to a shaped solid rust and corrosion inhibitor which prevents formation of rust on the metal walls of the tank, which eliminates the corroding ability of impurities in the fuel oil, and which serves to expel continuously from the tank those impurities which cause rust and corrosion.

Corrosion and rusting of fuel oil tanks is not caused by the fuel oil in the tanks but rather by the presence of varying amounts of impurities that enter the fuel tanks under normal operating conditions. These impurities are the sulfur and sulfur compounds in the fuel oil and the water droplets that are present in the tank. When the tank is partly empty, there will be a certain amount of moisture containing air in the tank. This moisture will condense as water droplets on the walls of the tank. Since the water is heavier than the oil in the tank, the water droplets will roll down the metal tanks walls through the oil to the bottom of the tank. In passing through the oil, the water droplets collect and carry along with them particles of sulfur and sulfur compounds that are present in the oil. In time the sulfur impurities will dissolve in the water to form sulphurous and sulphuric acids. This acidulated water in the tank will then cause corrosion and rusting of the fuel oil tanks.

To attempt to solve this problem powder type rust and corrosion inhibitors have been provided which are distributed throughout the oil in the oil tank. These powder type inhibitors, however, pass out of the tank with the oil and clog the nozzle, strainer and other working parts of the oil burner or else pass out entirely with the oil before they achieve their purpose.

In accord with my invention, I have provided a compressed or molded shaped solid containing ingredients which prevent rust and corrosion of fuel oil tanks and which further disperses the water in the tank throughout the oil so that the oil may be expelled in an emulsified state from the tank in small and harmless quantities. The shaped solid contains sodium metasilicate, a rust inhibiting alkaline salt and a non-ionic dispersant of the alkylphenyl ether of polyethylene glycol type. This shaped solid is heavier than oil so that it will always be found in the bottom of the fuel oil tank where the water, if any, will collect. Moreover, the shaped solid is water soluble and oil insoluble so that it operates only in the presence of water. If no water is present in the tank, the inhibitor will lie inactive at the bottom of the tank until such time as water collects in the tank.

Accordingly, it is an object of the present invention to provide a rust and corrosion inhibitor for use in fuel oil tanks, which inhibitor is in a compressed or molded solid shape and which operates only when water is present in the fuel oil tank.

Another object of the present invention is to provide a rust and corrosion inhibitor for use in fuel oil tanks which is in the form of a shaped solid and which is able to disperse any water in the tank throughout the oil medium.

Another object of the present invention is to provide a rust and corrosion inhibitor for fuel oil tanks which is heavier than oil so that it may sink to the bottom of the fuel oil tank.

A still further object of the present invention is to provide a rust and corrosion inhibitor of the above described character which renders a fuel tank rust proof by protectively coating the walls thereof and by causing the continuous elimination of any water collected in the tank.

One advantage of my novel rust and corrosion inhibitor is that it serves to prolong the life of a fuel oil tank by eliminatnig rust and corrosion.

Another advantage of my novel rust and corrosion inhibitor is that it eliminates the use of aqueous rust inhibitors, which only serve to add more water to the fuel oil tank.

A further advantage of the present invention is that it eliminates the use of the powder type rust and corrosion inhibitors.

A still further advantage of my novel rust and corrosion inhibitor is that it in no way affects the burning quality of the fuel oil.

Additionally, my novel rust and corrosion inhibitor has the advantage that it will, due to its shape and weight, find the lowest part of the oil tank where the water in the oil tank eventually collects.

Other objects and advantages of the present invention will become more apparent as it is described in detail below.

My novel rust and corrosion inhibitor contains from 75% to 85% by weight of a rust inhibiting alkaline salt as, for example, sodium nitrite, sodium citrate, sodium carbonate, sodium bicarbonate, sodium chromate, sodium phosphate, lithium citrate, lithium carbonate, lithium bicarbonate, 5% to 15% by weight of sodium metasilicate, and from 5% to 15% by weight of a non-ionic dispersant which is a mixture of condensation products of alkylphenols and ethylene oxide wherein the alkyl group has at least four carbon atoms.

These non-ionic dispersants that I employ are described in Patent No. 2,213,477 to Steindorff et al. The above described non-ionic dispersants are commonly referred to as alkylphenyl ethers of polyethylene glycol.

When the rust and corrosion inhibitor is dropped into a fuel oil tank, it will descend to the bottom-most part of the tank where any collected water will be located. The inhibitor will dissolve in the water and liberate the sodium metasilicate and the rust inhibiting alkaline salt so as to alkalize the water. Once the water in the tank is alkaline, corrosion and rust will immediately cease. In addition, the inhibitor causes a protective coating to form on the metal walls of the tank.

If no water is present in the tank, the inhibitor will lie at the bottom of the fuel oil tank until such time as water collects. This is because the ingredients comprising the inhibitor are insoluble in oil and soluble in water and because the shaped solid inhibitor is heavier than oil. When water collects on the bottom of the tank, a proportionate part of the solid shape will dissolve to alkalize the water and provide a protective coating on the tank walls which are exposed to the water.

Ordinarily, a non-ionic dispersant of the alkylphenyl ether of the polyethylene glycol type would induce corrosion and rusting. However, the presence of the rust inhibiting alkaline salt and sodium metasilicate keep the water in the tank on the alkaline side thereby reversing the tendency of the non-ionic dispersant to induce corrosion and rust. Moreover, the dispersant remains stable and free to form an oil-water emulsion. The dispersant gradually reacts with the water molecules in the salt solution to form oxonium complexes that are readily dispersable in the fuel oil medium. These oxonium complexes will form due to the presence of multiple close ether linkages so that the resultant compound is easily dispersed throughout the fuel oil when the oil is agitated. Thus, when fresh fuel oil is placed into the empty or practically empty tank, the water will be dispersed as an emulsion throughout the fuel oil medium and will more or less permanently remain in this state. Accordingly, small quantities of water will be continuously eliminated from the tank as the fuel oil is used and without affecting the burning quality of the oil.

In order to test the effectiveness of my novel composition, cleaned, polished and weighed metal coupons of SAE 1010 steel, 1" x 2" x 1/16", were immersed in closed jars containing Fuel Oil #2 and test solutions. The solutions consisted of water, water plus 0.1% inhibitor and water plus 0.5% inhibitor. The metal coupon in each jar was suspended in such fashion that a portion was immersed in both the fuel oil and the test solution. In all cases, the fuel oil was the top layer and the test solution was the bottom layer.

The tests were performed in triplicate, that is, three separate corrosion assemblies for each test solution. The entire series of corrosion assemblies were stored at 180° F. for 200 hours. At the end of the test period, the metal coupons were removed, washed with benzol and alcohol, dried and then weighed. The corrosion results are reported below in terms of loss in weight in milligrams.

The results of these tests will be found in the following table.

TABLE 1

| Specimen No. | No. Inhibitor | 0.1% Inhibitor | 0.5% Inhibitor |
|---|---|---|---|
| 1 | 57.7 | 0.0 | 0.0 |
| 2 | 54.0 | 0.0 | 0.0 |
| 3 | 51.0 | 0.0 | 0.0 |
| Ave. Loss | 54.2 | 0.0 | 0.0 |
| Appearance of Solution after Test. | Rusty | Clear | Clear. |
| Appearance of Coupons after Test. | Bottom half pitted and discolored. | No change | No change. |

The data of the above table clearly demonstrates the effectiveness of my rust and corrosion inhibitor.

As one example of my rust and corrosion inhibitor, I provide a shaped solid containing 80% by weight of a rust inhibiting alkaline salt, 10% by weight of sodium metasilicate and 10% by weight of a non-ionic dispersant which is the condensation product of alkylphenols and ethylene oxide. The ingredients may be compressed or molded in any conventional manner into a shaped solid.

It is important that the inhibitor be in the form of a shaped solid. The use of an aqueous solution of the ingredients of my novel composition would be precluded because it would only serve to add more water to the tank.

It is also impossible to employ the ingredients in powder form because the mixture of ingredients have different specific gravities, some of which are less than that of fuel oil. Accordingly, the ingredients would separate and float on top of or within the fuel oil and fail to reach the bottom of the tank so that they could act together to prevent rust and corrosion. However, when the composition is employed as a compressed or molded shaped solid, the aggregate has a specific gravity greater than oil. Thus the inhibitor will sink through the oil and reach the bottom of the tank where the water layer is located.

The shaped solid can be in the form of compressed or molded tablets, blocks, sticks, cones, balls or any other similar shape. However, it is preferable to employ a shape such as a sphere which will permit the inhibitor to roll to the bottom-most portion of the tank. It is this area that the inhibitor must reach to be operative.

Similar results may be obtained if other oil insoluble non-ionic dispersants in place of the condensation products of alkylphenol ethylene oxide are used.

While the invention has been described in detail above, it is not to be limited thereto. Hence, it is desired to cover any and all forms and modifications of the invention which may come within the language and scope of the appended claim.

I claim:

The method of inhibiting rust and corrosion in a fuel oil tank having a bottom, sides, ends and a top, which in normal operation thereof has fuel oil periodically withdrawn and admitted to maintain a reservoir of oil in said tank, and wherein an aqueous layer containing water-soluble corrosive impurities, collects in a layer underlying oil in said tank, said method comprising: introducing into said tank a solid body consisting essentially of sodium metasilicate as a binder, in amount from 5–15% by weight, a substantially water-soluble rust and corrosion inhibiting alkaline salt, selected from the group consisting of sodium nitrite, sodium citrate, sodium carbonate, sodium bicarbonate, sodium chromate, sodium phosphate, lithium citrate, lithium carbonate, lithium bicarbonate, in amounts from 75–85 percent by weight, and an alkyl phenyl ether of polyethylene oxide and phenol water-in-oil emulsifying agent in amount from 5–15% by weight, said solid body being sufficiently heavier than oil to sink through the oil into said aqueous layer, said alkaline salt dissolving in said aqueous layer, said water-in-oil dispersant causing said aqueous layer together with said water-soluble impurities and said therein dissolved inhibitor to disperse in said oil, whereby said inhibitor becomes distributed to portions of said tank normally subject to rust and corrosion, and said corrosive materials dispersed in said oil are withdrawn from said tank together with said oil during the normal operation thereof.

References Cited by the Examiner

UNITED STATES PATENTS

| | | | |
|---|---|---|---|
| 1,565,043 | 12/1925 | Avis | 148—22 XR |
| 2,114,923 | 4/1938 | Holstead | 252—387 XR |
| 2,213,477 | 9/1940 | Steindorff et al. | |
| 2,522,447 | 9/1950 | Harris. | |
| 2,529,177 | 11/1950 | Nieland et al. | 252—180 XR |
| 2,795,560 | 6/1957 | Williams. | |
| 2,824,059 | 2/1958 | Chamot. | |

OTHER REFERENCES

Corrosion of Metals, by Evans, Second Ed., 1926, published by Edward Arnold & Co., London, pages 112 and 113.

The Condensed Chemical Dictionary, 5th Ed., 1956, Reinhold Publishing Co., New York, pages 998 and 1006.

LEON D. ROSDOL, *Primary Examiner.*

JULIUS GREENWALD, *Examiner.*

M. WEINBLATT, *Assistant Examiner.*